(12) United States Patent
Patel et al.

(10) Patent No.: US 7,688,967 B2
(45) Date of Patent: Mar. 30, 2010

(54) DYNAMIC SPEED DIAL NUMBER MAPPING

(75) Inventors: Labhesh Patel, San Francisco, CA (US);
Shmuel Shaffer, Palo Alto, CA (US);
Sanjeev Kumar, San Francisco, CA
(US); Mukul Jain, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 384 days.

(21) Appl. No.: 11/421,447

(22) Filed: May 31, 2006

(65) Prior Publication Data

US 2007/0280437 A1 Dec. 6, 2007

(51) Int. Cl.
*H04M 1/56* (2006.01)
(52) U.S. Cl. .................. 379/356.01; 379/93.07; 379/142.06; 340/7.53; 358/1.15; 455/415; 455/564; 726/4
(58) Field of Classification Search .......... 455/564, 455/412.2, 412.1, 417, 418, 464, 415; 379/93.24, 379/88.13, 142.06, 355.06, 93.07, 356.01; 340/7.39, 407.1, 7.53; 370/338, 356; 705/14; 707/6; 358/1.15; 726/4
See application file for complete search history.

(56) References Cited

U.S. PATENT DOCUMENTS

| | | | | |
|---|---|---|---|---|
| 5,394,140 | A * | 2/1995 | Wong et al. | 340/7.39 |
| 5,930,350 | A | 7/1999 | Johnson | |
| 6,184,796 | B1 * | 2/2001 | Rivero et al. | 340/407.1 |
| 6,192,218 | B1 * | 2/2001 | Laufmann et al. | 340/7.53 |
| 6,298,131 | B1 * | 10/2001 | Veschi | 379/355.06 |
| 6,356,356 | B1 * | 3/2002 | Miller et al. | 358/1.15 |
| 6,570,964 | B1 | 5/2003 | Murveit et al. | |
| 6,603,846 | B1 * | 8/2003 | Cannon et al. | 379/142.06 |
| 6,625,444 | B1 * | 9/2003 | Fleming et al. | 455/418 |
| 6,738,462 | B1 * | 5/2004 | Brunson | 379/142.06 |
| 6,956,848 | B1 * | 10/2005 | Keung et al. | 370/356 |
| 7,010,116 | B1 * | 3/2006 | Fleming, III | 379/356.01 |

(Continued)

FOREIGN PATENT DOCUMENTS

EP 1601169 A1 11/2005

OTHER PUBLICATIONS

"International Application Serial No. PCT/US2007/70021, Search Report and Written Opinion mailed on Sep. 8, 2008", 6 pgs.

(Continued)

*Primary Examiner*—Gerald Gauthier
(74) *Attorney, Agent, or Firm*—Schwegman, Lundberg & Woessner, P.A.

(57) ABSTRACT

A method of facilitating a telephonic response to an electronic message is described. The method includes determining at least one telephone number from a received electronic message, and assigning the determined telephone number dynamically to a button on the telephone to provide a speed dial button on the telephone. Determining the telephone number may include comparing an electronic mail address in an address field of the electronic message with a telephone directory to determine a telephone number associated with the address. If the electronic message is a text or a voice message, determining the telephone number may include parsing a body of the message to determine a telephone number, if present, which has been included into the body of the text message.

14 Claims, 5 Drawing Sheets

U.S. PATENT DOCUMENTS

| | | | |
|---|---|---|---|
| 7,024,210 B2* | 4/2006 | An | 455/466 |
| 7,231,229 B1* | 6/2007 | Hawkins et al. | 455/564 |
| 7,356,331 B2* | 4/2008 | Lee et al. | 455/412.1 |
| 7,502,609 B2* | 3/2009 | Kayzar et al. | 455/418 |
| 2002/0107051 A1* | 8/2002 | An | 455/564 |
| 2003/0026392 A1* | 2/2003 | Brown et al. | 379/88.13 |
| 2003/0149693 A1* | 8/2003 | Dobler | 707/6 |
| 2004/0141599 A1* | 7/2004 | Tang et al. | 379/93.24 |
| 2004/0260413 A1 | 12/2004 | Melideo | |
| 2004/0266402 A1* | 12/2004 | Schavitz | 455/412.2 |
| 2005/0015626 A1* | 1/2005 | Chasin | 713/201 |
| 2005/0069124 A1* | 3/2005 | Isozaki | 379/355.02 |
| 2005/0250483 A1* | 11/2005 | Malik | 455/415 |
| 2006/0034434 A1* | 2/2006 | Kashi | 379/93.07 |
| 2006/0189303 A1* | 8/2006 | Rollender | 455/417 |
| 2007/0177560 A1* | 8/2007 | Swartz et al. | 370/338 |
| 2007/0214040 A1* | 9/2007 | Patel et al. | 705/14 |

OTHER PUBLICATIONS

European Application No. 07815048.9, Extended Search Report Mailed Sep. 21, 2009, 10 pgs.

"Method and apparatus for automatic contextual call return, calendering, and address book search", *IBM Technical Disclosure Bulletin, 37*, (Apr. 1994), 373-374.

* cited by examiner

DYNAMIC SPEED DIAL NUMBER MAPPING

FIELD

This application relates to telephonic communication, and specifically to a method of and system for associating a telephone number with a telephone button on a telephone.

BACKGROUND

Current telephones e.g., mobile telephones, VoIP phones or the like) can have telephone numbers pre-assigned to single telephone buttons to provide a speed dial function. In response to a speed dial button being pressed, the telephone number pre-assigned to that button is dialed. The association of the telephone number with the button typically is by manual pre-programming of the telephone, the telephone numbers therefore being statically assigned to respective buttons.

Also, current voicemail systems can provide an option to initiate a telephone call to a sender of a voicemail message. This option is only available during the telephone call in which the voicemail message is retrieved, and as soon as the telephone call is terminated, so too is the option to initiate a telephone call to a sender of a voicemail message.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1:
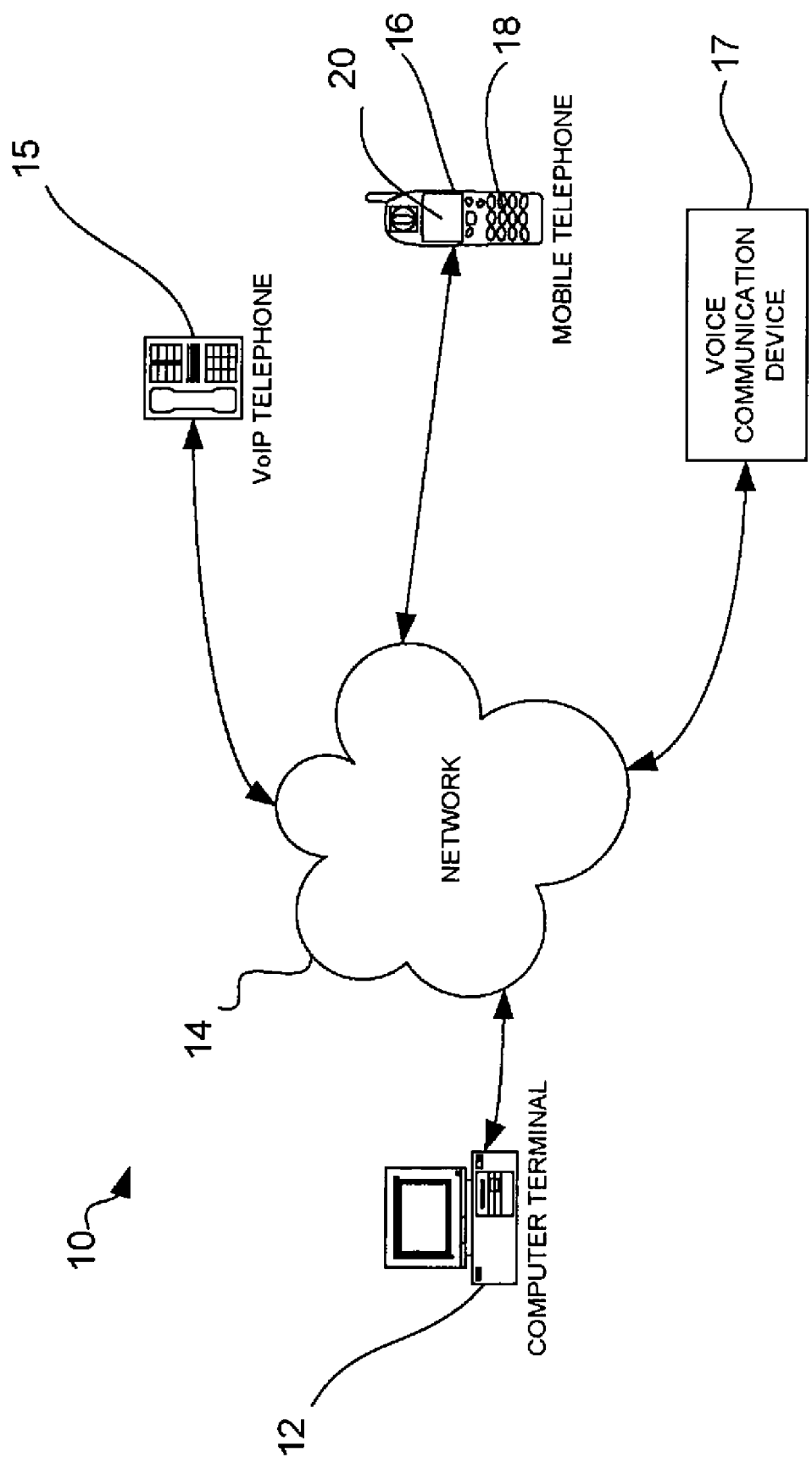
FIG. 1 is a diagrammatic representation of a communication system used in an example embodiment of the present invention.

In FIG. 1 of the drawings, an example communication system is generally indicated by reference numeral 10. The communication system 10 includes a computer terminal 12, a telecommunication network 14, a Voice over IP (VoIP) telephone 15, a mobile telephone 16, and other voice-communication device 17. It will however be appreciated that the system 10 may include any number of communication devices (both desktop and mobile) that are capable of allowing voice communication.

The telecommunication network 14 includes, at least partially, the Internet and one or more cellular base stations. It will however be noted that the telecommunication network 14 may be any network including one or more Local Area Networks (LANs) and/or one or more Wide Area Networks (WANs).

The computer terminal 12 includes a network interface device, for example in the form of a network card, a modem, or the like, for connection to the telecommunication network 14. The computer terminal 12 is used for illustrative purposes only, and it is to be appreciated that the computer terminal 12 could be replaced by any electronic communication device, such as a mobile telephone similar to the mobile telephone 16, a PDA (Personal Digital Assistant), or the like. In an example embodiment, the computer terminal 12 may perform Private Brach Exchange (PBX) functionality and be networked to a plurality of telephones. In an example embodiment, the computer terminal 12 may include a voice mail system to provide voice mail functionality.

The VoIP telephone 15 (further shown in FIG. 2 and FIG. 4) in this example is an IP (Internet Protocol) telephone. Although a VoIP telephone 15 is used as an example, other telephones may also be used (e.g., the other telephones shone in FIG. 1). The term 'telephone' in this specification is understood to include any communication device having telephone dialing capabilities, for example an IP or VoIP (Voice over IP) telephone, a cellular telephone, a PDA based telephone, a laptop which includes a modem or any computer which includes a CTI (computer telephony interface), and the like.

The mobile telephone 16 is in wireless communication with the telecommunication network 14, for example via the cellular base stations.

The mobile telephone 16 is operable to receive an electronic message from, for example, the computer terminal 12. The term 'electronic message' is understood to include a live or stored voice message, an e-mail message, an IM (Instant Message), a text message, for example in SMS (Short Message System) format, and the like. It is also to be noted that the mobile telephone 16 may also receive signalling and control messages from the computer terminal 12. Further, the VoIP telephone 15 may be communicatively coupled to a desktop computer that is operable to receive an electronic message.

If the message is an e-mail message it will be appreciated that electronic messages of this type have as their source and destination addresses e-mail addresses, for example in the form name@domain.com, or other alphanumeric alias associated with a sender or recipient(s) of the message. Further email addresses may also be present in the body of the email. These addresses are typically not telephone numbers. However, if the mobile telephone 16 has a database (or alternatively has access to a database) which contains email addresses with the names and phone numbers of the persons associated with those email addresses, then the phone number and name of the person associated with a particular email, or other, address can be obtained from the database. Clearly, if the mobile telephone 16 does not have such a database, then the invention contemplates setting up and populating such a database or providing access to such a database via the network 14. Further, the email message could include, in the body thereof, telephone numbers. If so, the presence of such telephone numbers may be detected, and extracted, by parsing the body of the message. Similarly, if the message is a voice message (either live or stored), it could contain telephone numbers in the body thereof, and these telephone numbers may also be detected and extracted by parsing the voice message. In addition or instead, the telephone number may be determined using an automatic number identification (ANI) service. An example embodiment is further described with reference to an e-mail message received by the mobile telephone 16, although it is to be appreciated that the example embodiment may also be applied to the other forms of an electronic message.

The mobile telephone 16 includes a keypad 18 and a display 20. The mobile telephone 16 has one or more telephone buttons. 'Button' in this context includes physical buttons, for example on the keypad 18 of the mobile telephone, or virtual buttons (or soft keys), for example demarcated zones on the display 20 of the mobile telephone 16. The display 20 of the mobile telephone 16 is in the form of a touch-sensitive screen, and virtual buttons can therefore be pressed by contacting a demarcated zone of the display 20 with a stylus or other pointing tool.

Figure 2:
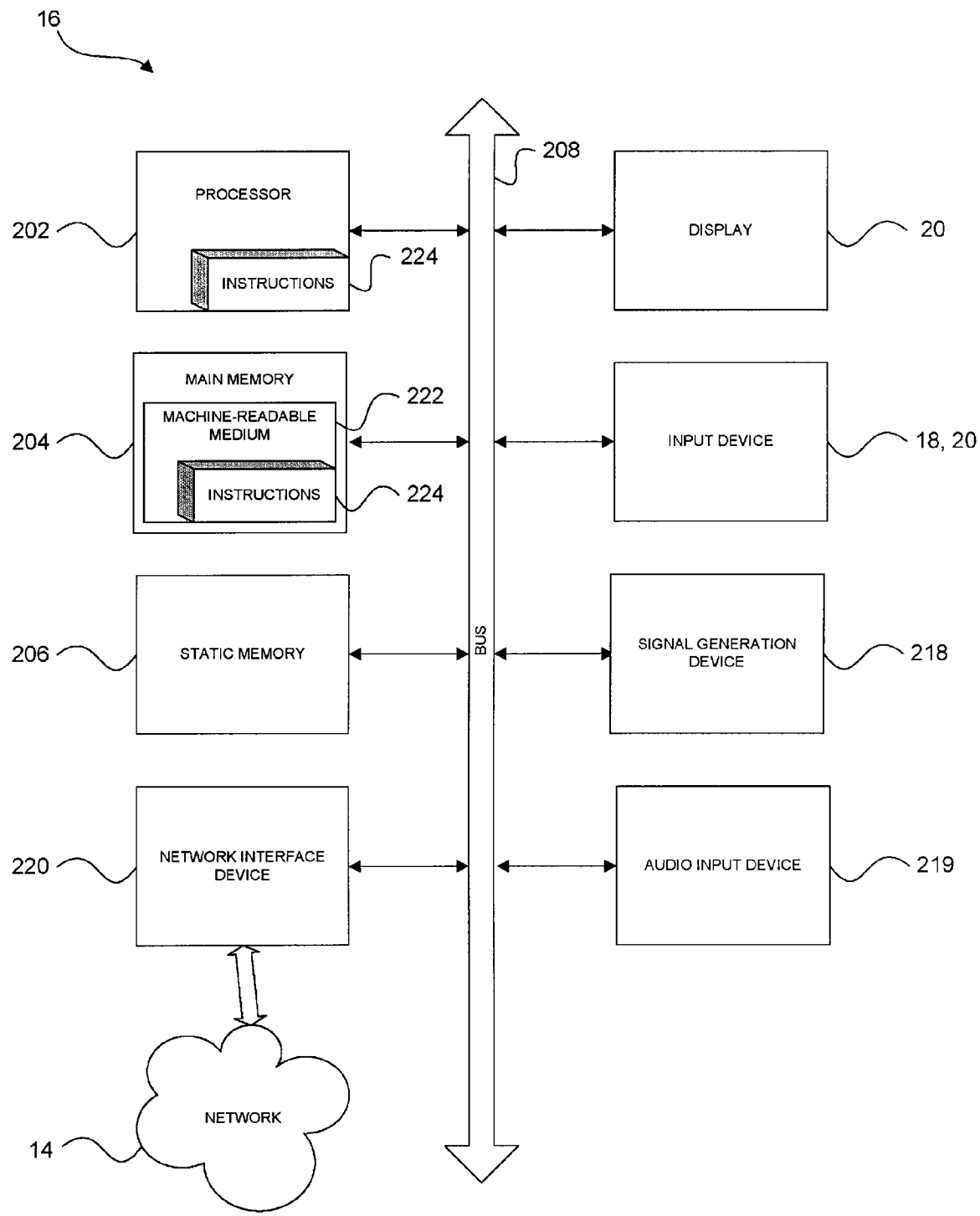
FIG. 2 is a diagrammatic representation of a machine in the example form of a mobile telephone within which a set of instructions, for causing the machine to perform any one or more of the methodologies discussed herein, may be executed.

FIG. 2 of the drawings shows a diagrammatic representation of a machine in the example form of a mobile telephone 16 within which a set of instructions, for causing the mobile telephone 16 to perform any one or more of the methodologies discussed herein, may be executed.

The example mobile telephone 16, or the VoIP telephone 15, as the case may be, includes a processor 202 (for example, a central processing unit (CPU), a graphics processing unit (GPU) or both), a main memory 204 and a static memory 206, which communicate with each other via a bus 208. The mobile telephone 16 further includes display 20 (for example, a liquid crystal display (LCD) or thin film transistor (TFT) screen). The mobile telephone 16 also includes an input device in the form of a keypad 18 or a touch-sensitive display 20, a signal generation device 218 (for example, a speaker), an audio input device 219 (for example, a microphone), and a network interface device 220.

The main memory 204 includes a machine-readable medium 222 on which is stored one or more sets of instructions and data structures (for example, software 224) embodying or utilized by any one or more of the methodologies or functions described herein. The software 224 may also reside, completely or at least partially, within the processor 202 during execution thereof by the mobile telephone 16, the processor 202 also constituting machine-readable media.

The software 224 may further be transmitted or received over the telecommunication network 14 via the network interface device 220 utilizing any one of a number of well-known transfer protocols (for example, IP, GPRS, 3G).

While the machine-readable medium 222 is shown in an example embodiment to be a single medium, the term 'machine-readable medium' should be taken to include a single medium or multiple media that store the one or more sets of instructions. The term 'machine-readable medium' shall also be taken to include any medium that is capable of storing, encoding or carrying a set of instructions for execution by the mobile telephone 16 and that cause the mobile telephone 16 to perform any one or more of the methodologies of the present invention, or that is capable of storing, encoding or carrying data structures utilised by or associated with such a set of instructions. The term 'machine-readable medium' shall accordingly be taken to include, but not be limited to, solid-state memories, optical and magnetic media, and carrier wave signals.

The main memory 204, or other storage means, for example a removable memory card, a SIM (Subscriber Identity Module) card, or the like, of the mobile telephone 16 has stored thereon a telephone directory which includes contact details of a plurality of contacts. Alternatively, or in addition, the telephone directory is hosted at a server remote (not shown) from the mobile telephone 16, the remote server being accessible by the mobile telephone 16 to access the telephone directory. The contact details typically include a name of a contact, a telephone number of the contact, and an e-mail address of the contact.

An e-mail message (as well as certain other types of electronic messages) which is sent from the computer terminal 12, via the telecommunications network 14, to the mobile telephone 16, includes a plurality of address fields (for example, From:, To:, CC:, and BC:), and a plurality of addresses can be entered in each field. An e-mail message can therefore include more than one addressee in the address fields.

When the mobile telephone 16 receives the e-mail, the mobile telephone 16, under the direction of the software 224, analyses the e-mail message to determine one or more telephones numbers from the e-mail message. The telephone 16 therefore includes a determination component to determine one or more telephones numbers from the e-mail message. In an example embodiment, a search for the telephone numbers can happen either when the mobile telephone 16 receives the e-mail message or, for example, only when the user opens the e-mail message and reads it.

A first way in which the determination can be done is by comparing at least one address in an address field of the electronic message to addresses in the telephone directory to determine a telephone number which is associated with the address. For example, an address in the From: field (which is the address from which the electronic message was sent) is compared against a plurality of addresses in the telephone directory. If a match for the From: address is found in the telephone directory, a telephone number, if present, which is associated with the address is read from the telephone directory. It is to be appreciated that the address and the associated telephone number typically belong to the same contact.

There may be more than one address in the address fields, for example, if the message was sent to a plurality of recipients, there will be more than one address in the To:, CC:, or BC: fields. Each address (address from the address of the user of the mobile telephone 16) is compared against the telephone directory, and for each address a corresponding telephone number is determined.

A second example way in which the determination can be done is by parsing the body, or title, of the electronic message to determine if any telephone numbers have been included in the message. The telephone number would typically appear in the body of the message, so the body of the message is therefore parsed to determine if it includes a sequence of numbers which matches a format of a telephone number. In the case where the electronic message is a voice message, the body of the voice message is parsed, for example by voice recognition software which in such a case forms part of the software 224, to determine if the voice message includes a sequence of numbers which matches the format of a telephone number.

The mobile telephone 16 includes a buffer in which a plurality of telephone numbers are storable. In an example embodiment, telephone numbers determined from more recently read e-mails may be buffered rather than numbers determined from less recently read e-mails. Once a telephone number has been determined, in whichever manner, it is stored in the buffer and the telephone number is automatically assigned to a button (e.g., a speed dial button) on the mobile telephone 16. In an example embodiment, telephone numbers from an e-mail message which is currently open may be given priority and assigned to the head of a buffer of telephone numbers. Similarly, if the user is listening to the a voicemail message, the system may retrieve telephone numbers form a body of the voicemail message using Adaptive Speech Recognition (ASR) or natural language techniques and place them at the head of the buffer. The telephone number is dynamically assigned to the button, and therefore requires no user intervention. Thus, unlike the prior art that requires pre-programming of speed dial numbers on a telephone, one or more telephone numbers can be dynamically assigned to one or more speed dial buttons on a telephone. If more than one telephone number was determined (e.g., of a caller or other people who were mentioned in a message), the telephone numbers may be respectively read from the buffer and assigned to separate buttons. The mobile telephone 16 thus includes an assignment component to assign each telephone number to a button.

In the case where the electronic message is a voicemail message, the telephone number from which the voicemail message was sent may be stored in the buffer so that that telephone number is assigned to a speed-dial button even after the telephone call during which the voicemail message was retrieved is terminated. The button can be labelled with the name of the person who left the voicemail message, if the name is present in the telephone directory, or the button can simply be labelled 'call sender' when the phone number of the sender has been retrieved from the voice message.

It is to be appreciated that, in the example embodiment of FIG. 2, the processor 202 and the software 224 of the mobile telephone 16 provide the determination component and the assignment component. It will also be appreciated that these components, or similar components, may be provided in any voice-communication device to allow dynamic programming or assignment of speed-dial functionality.

In the embodiment where the button is a virtual button, for example a demarcated zone on a display 20 of the mobile telephone 16, the button may be conveniently labelled with a name of the contact with whom the telephone number is associated. Instead, if the button is on a keypad 18 of the mobile telephone 16, a legend may be displayed on the display 20 to indicate which button has been assigned to which contact. The name of the contact may also be read from the telephone directory.

The example embodiments extend to initiating a video call (e.g., using a video phone or any other video communication device/platform such as a computer connected to the Internet).

A further example option includes assigning a plurality of telephone numbers to a single button. In response to the button being pressed or selected, the mobile telephone 16 initiates a conference call to all the telephone numbers assigned to the button. In an example embodiment, multiple telephone numbers can be dynamically assigned to a single speed dial button so that the user can create a conference call with, for example, a plurality of users listed in an email message (e.g., in the body of the message or in the various address fields).

The various ways in which a telephone number is determined and assigned to a button may be manageable via a selection menu on the mobile telephone 16, the user being able to select preferences via the selection menu.

It is to be appreciated, therefore, that telephone numbers are not statically pre-assigned to buttons. The process of assigning a telephone number to a button is dynamic and pre-emptive, requiring no user intervention (it can even be done without the knowledge of the user). Stated differently, telephone numbers are dynamically mapped to buttons of the mobile telephone 16 (or any voice-communication device). Different telephone numbers will be assigned to the same buttons (the buttons therefore being recycled) in response to a new e-mail message or voice message having different associated with different telephone numbers.

Figure 3:
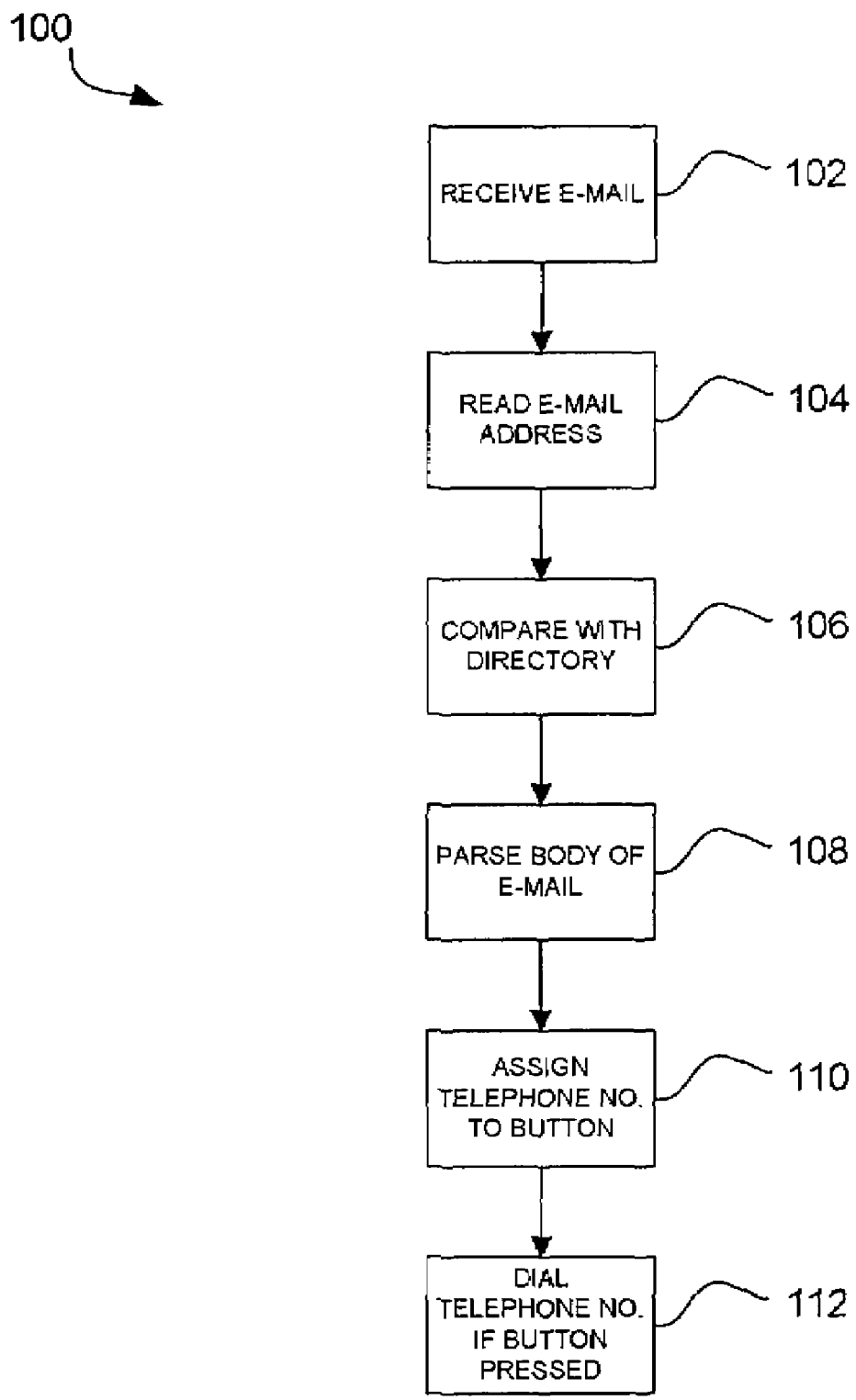
FIG. 3 is a flow diagram of steps for performing any one or more of the methodologies discussed herein.

In use, and referring now also to FIG. 3 which shows an example flow diagram 100 of steps in accordance with the method, an e-mail message is sent, at block 102, from the computer terminal 12, via the telecommunications network 14, to the mobile telephone 16. It is assumed, by way of example, that the e-mail was sent to four e-mail addresses (four addresses in the To: field, one address being that of the user of the mobile telephone 16).

The mobile telephone 16, under the direction of the software 224, analyses the e-mail message. For example, the analysis may be done as soon as the message is received or alternatively when the message is opened. First, the mobile telephone 16 reads, at block 104, the other three e-mail addresses from the address field of the e-mail. Secondly, the mobile telephone 16 compares, at block 106, the e-mail addresses to the telephone directory of the user to determine the telephone numbers and names of contacts associated with the e-mail addresses. Thirdly, the mobile telephone 16 parses, at block 108, the body of the e-mail to determine if any telephone numbers had been written in the e-mail. The telephone number and name of each contact is stored in a buffer in the main memory 204 of the mobile telephone 16.

The three telephone numbers (determined at block 106) are assigned, at block 108, to buttons. The buttons, for example, are adjacent the display 20 of the mobile telephone 16, such that the display 20 can display the name of the contact adjacent the button to which the telephone number of the contact has been assigned. Pressing the button causes the mobile telephone 16 to initiate a telephone call to the telephone number assigned to the pressed button. A fourth button may be assigned to all three telephones numbers, and pressing the fourth button initiates a conference call to all three telephone numbers. Instead, and depending on the preferences of the user, a video call can be initiated. The user can select options and preferences via a selection menu on the mobile telephone 16. A further option available is to assign two or more telephone numbers to a button, and in response to that button being pressed, the mobile telephone 16 initiates a telephone call directly between the two telephone numbers, without the mobile telephone 16 being a party to the telephone call.

When the user receives (or alternatively opens) a subsequent e-mail, the steps are repeated from step 102. Contents of the buffer may be shifted out to accommodate new telephone numbers. In an example embodiment the dynamic assignment of the phone button may be reset as soon as the user no longer has the message open.

Figure 4:
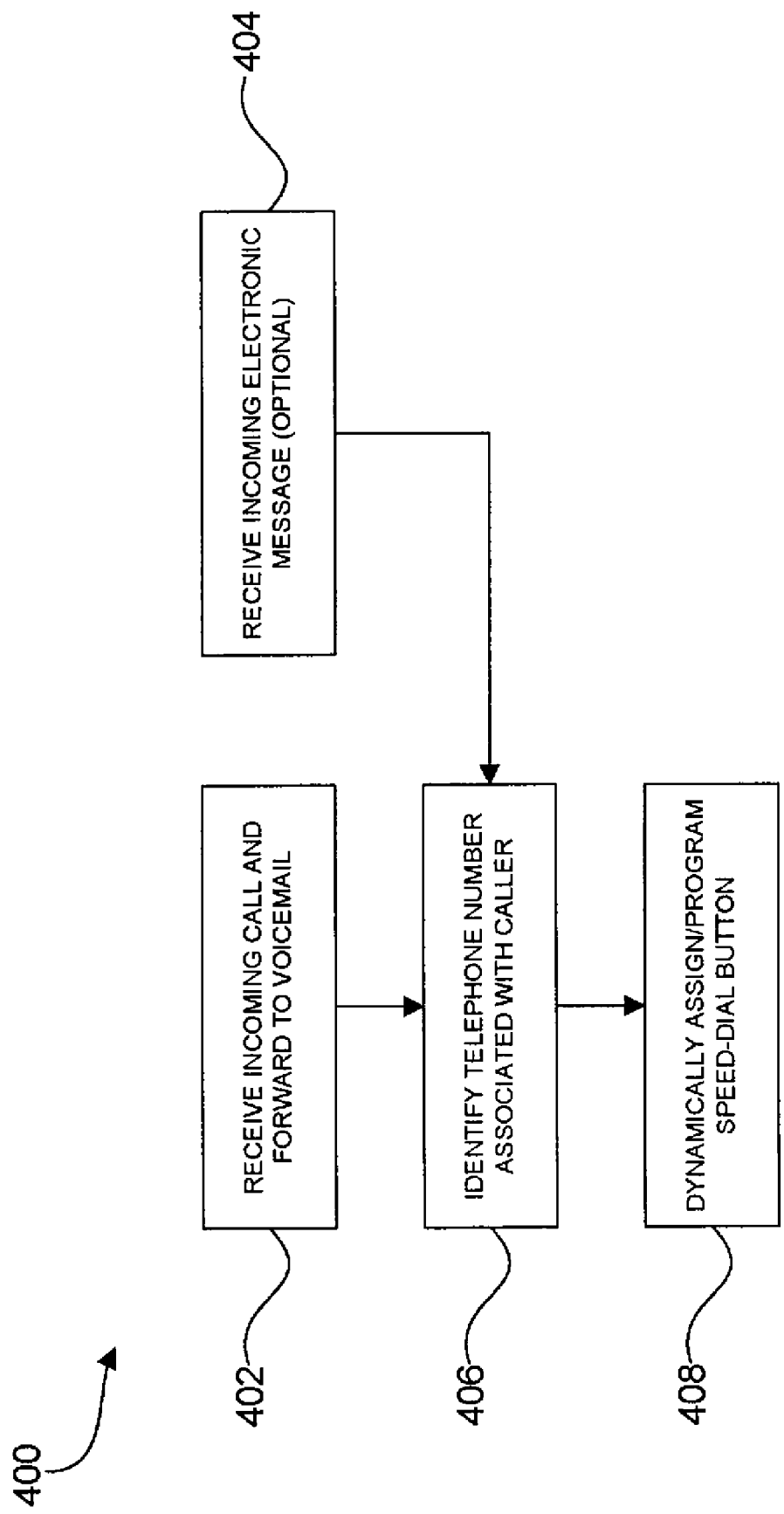
FIG. 4 shows a method, in accordance with an example embodiment, to assign a telephone number to a speed-dial button in response to a receiving a voicemail message in a voice mailbox associated with a telephone endpoint.
Figure 5:
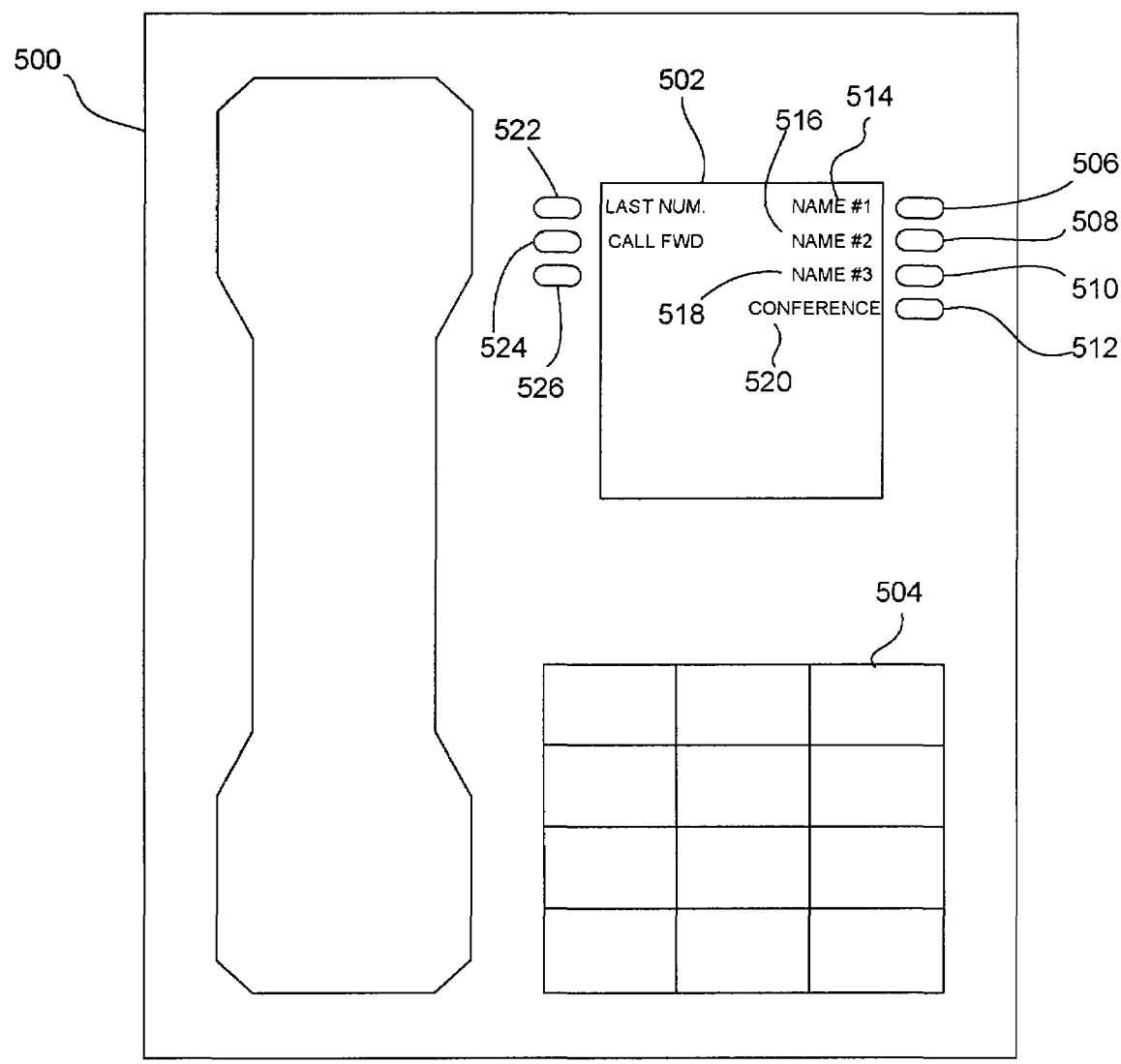
FIG. 5 shows an example user interface of a VoIP telephone in accordance with an example embodiment.

Referring to FIG. 4, reference numeral 400 generally indicates a method, in accordance with an example embodiment, to assign a telephone number to a speed-dial button in response to a receiving (or opening) a voicemail message in a voice mailbox associated with a telephone endpoint. For example, the method 400 may be used with a telephone endpoint 500 (see FIG. 5) and, accordingly, is described by way of example with reference thereto. The example telephone endpoint 500 is shown to include a display 502 and keypad 504. Dynamically programmable speed dial buttons 506 to 512 are provided and labels 514 to 520 displayed on the display 502 may be associated with the speed dial buttons 506 to 512. In the example embodiment, four physical speed dial button buttons are shown but it will be appreciated that more or less button may be provided. In an example embodiment, the buttons 506 to 512 may be soft buttons. Further buttons such as a Last Number dialed button 522, a Call Forward button 524, a Conference button 526 and other buttons for any other suitable telephone functionality may be provided. In the example telephone endpoint 500, functionality may be assigned to the buttons 506 to 512 as herein described.

Returning to FIG. 4, the method 400 may be deployed in a telephone management system such as a PBX that is connected to a voicemail system providing a plurality of voicemail boxes each associated with a telephone endpoint. As shown at block 402, an incoming call may be forwarded to an appropriate voicemail box and a message may be recorded in a conventional fashion. However, unlike current voicemail box systems, the method 400 at block 406 identifies a telephone number associated with the voicemail message and dynamically assigns or programs one of the speed dial buttons of the telephone endpoint 500. For example, assuming that the first voicemail message was left from a caller "NAME 1" then "NAME 1" is displayed on the display 502 adjacent the speed dial button 506 and the speed dial button 506 is assigned or programmed with a telephone number associated with "NAME 1". Likewise, a subsequent voicemail message from "NAME 2" may be result in the speed dial button 508 being programmed with a telephone number associated with "NAME 2", and so on. In an example embodiment the numbers assigned to the phone buttons may be retrieved from the body of the message as described by way off example above.

In an example embodiment, the method at block 404 receives an email message and programs or assigns one or more of the speed dial buttons as described herein before. In an example embodiment, the button 512 is associated with a conference call. Thus, a plurality of telephone numbers may be associated with the button 512.

Although embodiment embodiments of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The example embodiments provide an advantage of dynamically assigning a telephone number to a button of a voice-communication device (e.g., the mobile telephone 16, the VoIP telephone 15, or any other voice-communication device 17 both wired and wireless) without any user intervention. For example, in response to an e-mail being received or read, a voicemail be received or replayed, the telephone numbers are proactively, without the user needing to initiate the process or any human intervention, assigned to the buttons of the telephones.

What is claimed is:

1. A method of facilitating a telephonic response to an electronic message, the method including:
   in response to receiving an electronic message in the form of an electronic mail message, determining at least one telephone number from the received electronic message by parsing a body of the electronic message;
   determining at least one other telephone number from a header of the electronic message by comparing an electronic mail address in an address field of the electronic message with a directory to determine a telephone number associated with the address; and
   assigning the at least one telephone number determined from the body of the electronic message and the at least one other telephone number determined from the header of the electronic message dynamically to respective buttons on a telephone, to provide respective speed dial buttons on the telephone.

2. A method as claimed in claim 1, in which the electronic message is an electronic mail message and determining the at least one telephone number includes parsing text in the body of the mail message to determine a telephone number, if present, which has been written into the body of the message.

3. A method as claimed in claim 2, wherein the determining the at least one telephone number includes using an automatic number identification (ANI) service.

4. A method as claimed in claim 1, in which, in response to the button being pressed, the telephone initiates at least one of a telephone call, video call, and a conference call.

5. A method as claimed in claim 1, which includes determining a name of a person associated with the electronic mail address, and labelling the respective speed dial button with the name of the person.

6. A method as claimed in claim 1, in which the electronic message is received by the telephone.

7. A system for facilitating a telephonic response to an electronic message, the system including:
   a telephone;
   a determination component to determine, in response to receiving an electronic message in the form of an electronic mail message, at least one telephone number from the electronic message by parsing a body of the electronic message, and to determine at least one other telephone number from a header of the electronic message by comparing an electronic mail address in an address field of the electronic message with a directory to determine a telephone number associated with the address; and
   an assignment component operable to assign the at least one telephone number determined from the body of the electronic message and the at least one other telephone number determined from the header of the electronic message dynamically to respective buttons on a telephone, to provide respective speed dial buttons on the telephone.

8. A telephone which includes:
   a determination component to determine, in response to receiving an electronic message in the form of an electronic mail message, at least one telephone number from the electronic message associated with the telephone, by parsing a body of the electronic message, and to determine at least one other telephone number from a header of the electronic message by comparing an electronic mail address in an address field of the electronic message with a directory to determine a telephone number associated with the address; and
   an assignment component operable to assign the at least one telephone number determined from the body of the electronic message and the at least one other telephone number determined from the header of the electronic message dynamically to respective buttons on a telephone, to provide respective speed dial buttons on the telephone.

9. A telephone as claimed in claim 8, in which the determination component is operable to parse text in a body of the electronic mail message to determine the at least one telephone number, if present, which has been included in text in the body of the electronic message.

10. A telephone as claimed in claim 8, which is operable to determine the at least one telephone number using an automatic number identification (ANI) service.

11. A telephone as claimed in claim 8, in which, in response to the button being pressed, a dialer of the telephone initiates at least one of a telephone call, video call, and a conference call.

12. A telephone as claimed in claim 8, in which the determination component is operable to read a name of a person associated with the electronic mail address, and to label the respective speed dial button with the name of the person.

13. A system for facilitating a telephonic response to an electronic message, the system including:
  means for analyzing, in response to receiving an electronic message in the form of an electronic mail message, the electronic message to determine at least one telephone number from the message by parsing a body of the message, and to determine at least one other telephone number from a header of the electronic message by comparing an electronic mail address in an address field of the electronic message with a directory to determine a telephone number associated with the address; and
  means for assigning the at least one telephone number determined from the body of the electronic message and the at least one other telephone number determined from the header of the electronic message dynamically to respective buttons on a telephone, to provide respective speed dial buttons on the telephone.

14. A machine-readable medium embodying instructions which, when executed by a machine, cause the machine to:
  in response to receiving an electronic message in the form of an electronic mail message, determine at least one telephone number from a received electronic message by parsing a body of the electronic message, and to determine at least one other telephone number from a header of the electronic message by comparing an electronic mail address in an address field of the electronic message with a directory to determine a telephone number associated with the address; and
  assign the at least one telephone number determined from the body of the electronic message and the at least one other telephone number determined from the header of the electronic message dynamically to respective buttons on a telephone, to provide respective speed dial buttons on the telephone.

* * * * *